No. 765,006. PATENTED JULY 12, 1904.
H. HARTING.
LENS.
APPLICATION FILED FEB. 17, 1904.
NO MODEL.
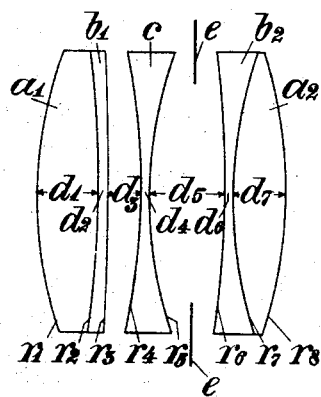

No. 765,006. Patented July 12, 1904.

UNITED STATES PATENT OFFICE.

HANS HARTING, OF BRUNSWICK, GERMANY.

LENS.

SPECIFICATION forming part of Letters Patent No. 765,006, dated July 12, 1904.

Application filed February 17, 1904. Serial No. 193,985. (No model.)

*To all whom it may concern:*

Be it known that I, HANS HARTING, director, a subject of the Emperor of Germany, residing at Brunswick, Duchy of Brunswick, Empire of Germany, have invented certain new and useful Improvements in Lenses, of which the following is a specification.

Chromatically, spherically, and astigmatically corrected lens systems are known which are characterized by a third-lens system, which is symmetrical in itself and symmetrical to the outer lenses, is placed between two symmetrical lens systems each consisting of at least two lenses, (crown and flint,) which lens systems both simultaneously contain crown-glass of higher or crown-glass of lower refraction than the flint glass, the lenses of which third-lens system (which lenses face the two outer lens systems) each form a glass pair with the lenses, which face them, of the outer systems, in which glass pair the glass with the smaller color dispersion has an index of refraction larger than or approximately equal to that of the other. Now it has been found that if crown-glass of a higher index of refraction than the flint glass be employed in the outer system it is preferable to arrange the middle system in such a way that the lenses which face one another of the inner and one outer system (or both outer systems) are composed of kinds of glass which are similar or both equally dissimilar as regards refraction and color dispersion. Apart from the greater cheapness of the glass in question, it is possible, owing to the greater multifariousness of their optical properties, to fulfil the most favorable conditions for removing faults of vision—such, for instance, as astigmatism and coma. For this it suffices to preserve the condition of symmetry, so that the two outer systems contain crown-glass of higher refraction than the flint glass without the succession, form, dimensions, and absolute value of the refraction-index and color dispersion coming in question as regards the symmetry. In explanation of this I will now refer to the accompanying drawing, in which a lens system characterized by the following equivalents is shown as an example.

If the eight different radii of curvature of the lenses be assumed to be indicated, as shown in the drawing, by $r_1$ $r_2$ $r_3$ $r_4$ $r_5$ $r_6$ $r_7$ $r_8$ and the lens thicknesses or air distance measured on the optical axis by $d_1$ $d_2$ $d_3$ $d_4$ $d_5$ $d_6$ $d_7$, the following equivalents result, for instance, for an equivalent focal length $f_D = 100$:

$$r_1 = +\ 25.84, \quad d_1 = 4.17$$
$$r_2 = -\ 66.67, \quad d_2 = 0.42$$
$$r_3 = -\ 166.65, \quad d_3 = 2.17$$
$$r_4 = -\ 41.71, \quad d_4 = 0.42$$
$$r_5 = +\ 25.92, \quad d_5 = 5.25$$
$$r_6 = -\ 65.26, \quad d_6 = 0.42$$
$$r_7 = +\ 27.16, \quad d_7 = 3.33$$
$$r_8 = -\ 27.96,$$

Diameter of aperture, 16.7; relative aperture, 1:6, ($f/6$.) The diaphragm or stop $e$ is placed in the space between the central and rear lens system.

The equivalents of the kinds of glass (indices of refraction for the Frauenhofer lines D and $C' = H\gamma$) are here assumed to be the following:

For $a_1$ : $n_D = 1.61330$, $n_{G}^{1} = 1.62723$, (heaviest baryta crown.)

For $b_1$ : $n_D = 1.56980$, $n_{G}^{1} = 1.58410$, (light baryta flint.)

For $c$ : $n_D = 1.60611$, $n_{G}^{1} = 1.62424$, (heavy silicate flint.)

For $b_2$ : $n_D = 1.53780$, $n_{G}^{1} = 1.55143$, (silicate glass.)

For $a_2$ : $n_D = 1.61330$, $n_{G}^{1} = 1.62723$, (heavy baryta crown.)

I declare that what I claim is—

A lens system consisting of two pairs of lenses, each pair of said pairs of lenses consisting of a crown and a flint glass lens, said crown-glass lens being of higher refraction than the flint-glass lens, and a lens interposed between the pairs of lenses, the lens of an outer pair of lenses which opposes said central lens and said central lens so constituted with respect to each other that the lens with the smaller color dispersion has a smaller index of refraction than the other, substantially as described.

In testimony whereof I have hereunto set my hand in presence of two subscribing witnesses.

HANS HARTING.

Witnesses:
WILHELM LEHRKE,
HERMANN VAHLBERG.